United States Patent [19]

Sepp

[11] 3,931,945
[45] Jan. 13, 1976

[54] ROTATING PARACHUTE

[75] Inventor: Oscar W. Sepp, Glen Cove, N.Y.

[73] Assignee: ILC-Steinthal, Inc., Roxboro, N.C.

[22] Filed: Aug. 7, 1974

[21] Appl. No.: 495,397

Related U.S. Application Data

[63] Continuation of Ser. No. 225,535, Feb. 11, 1972, abandoned, which is a continuation-in-part of Ser. No. 20,331, March 17, 1970, abandoned.

[52] U.S. Cl. ............................................. 244/145
[51] Int. Cl.² ........................................ B64D 17/18
[58] Field of Search ........... 244/145, 142, 146, 152; 102/35, 35.4

[56] References Cited
UNITED STATES PATENTS

| | | | |
|---|---|---|---|
| 2,523,276 | 9/1950 | Buhler | 244/142 |
| 2,770,432 | 11/1956 | Stevinson | 244/145 |
| 2,949,266 | 8/1960 | Sepp | 244/145 |
| 3,420,479 | 1/1969 | Odney | 244/152 |

Primary Examiner—Trygve M. Blix
Assistant Examiner—Barry L. Kelmachter

[57] ABSTRACT

A series of fabric panels in the shape of turbine vanes or air foils are arranged end to end in a continuous ring with spaces between adjacent vanes to permit the passage of air from the interior of the parachute over the outer surface of the vanes. Suspension lines at the inner corners of the vanes join to the mid portion of suspension lines from the outer corners which converge concentrically to the attachment point to the load.

16 Claims, 7 Drawing Figures

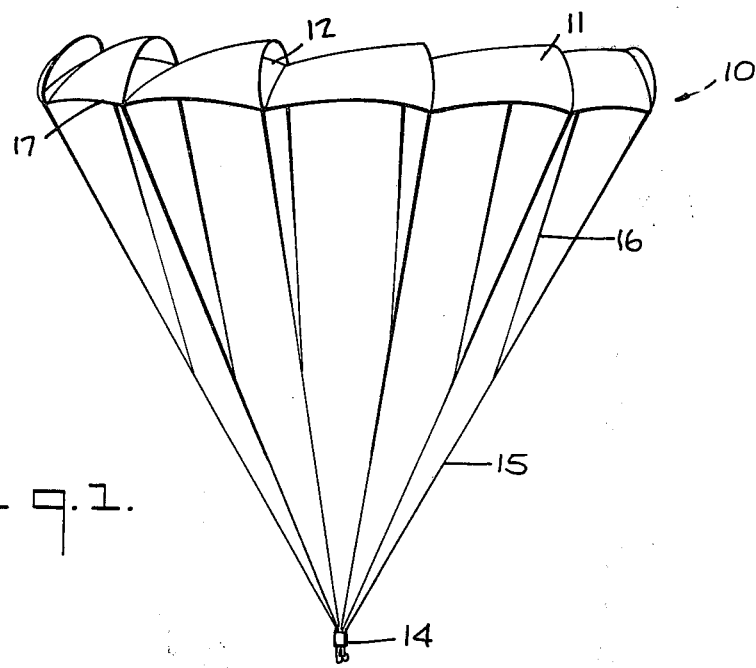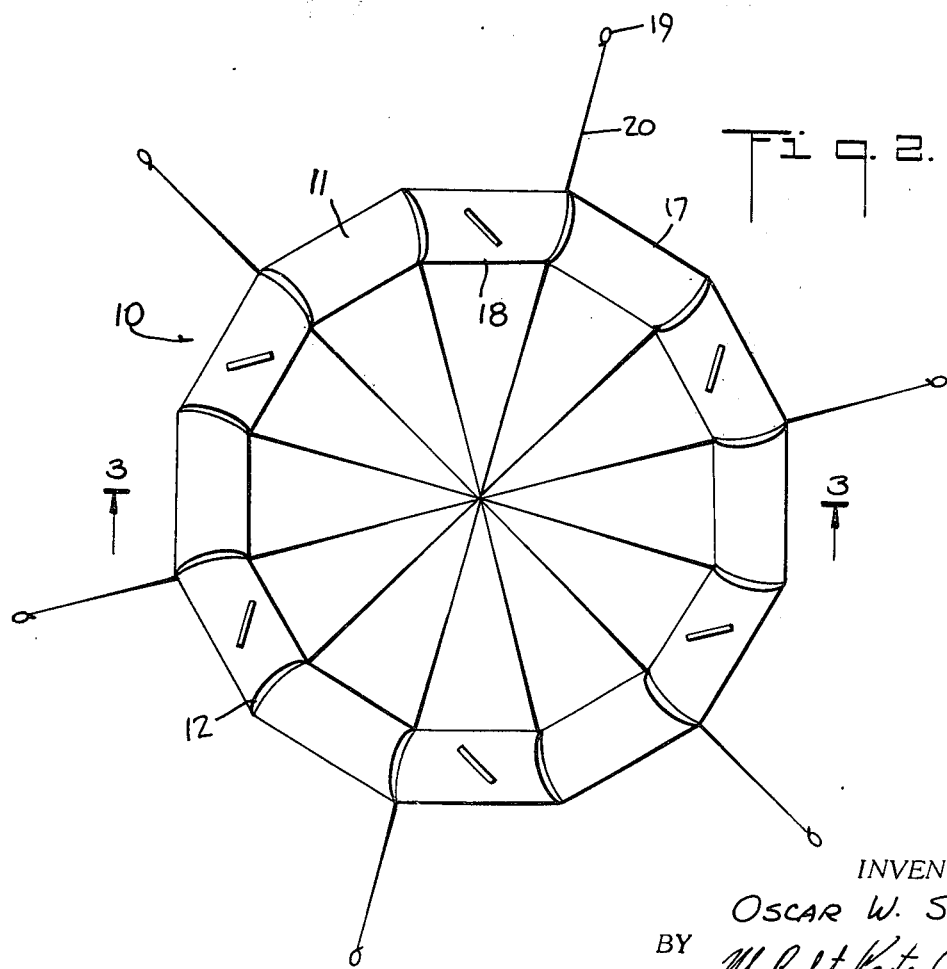

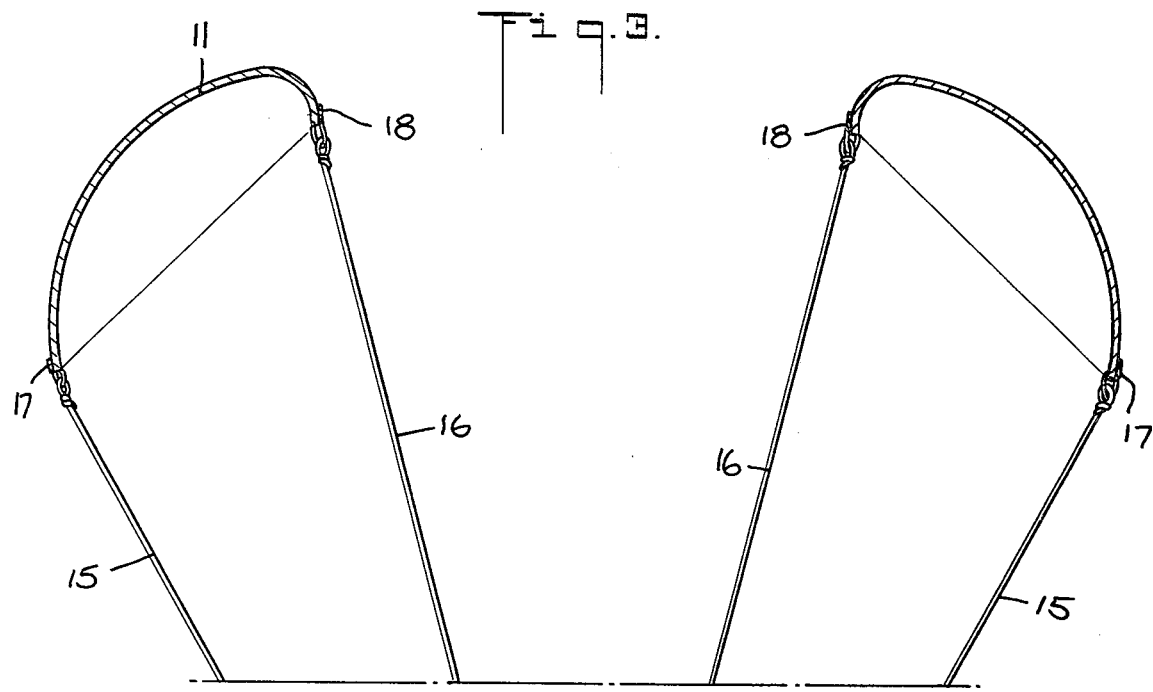
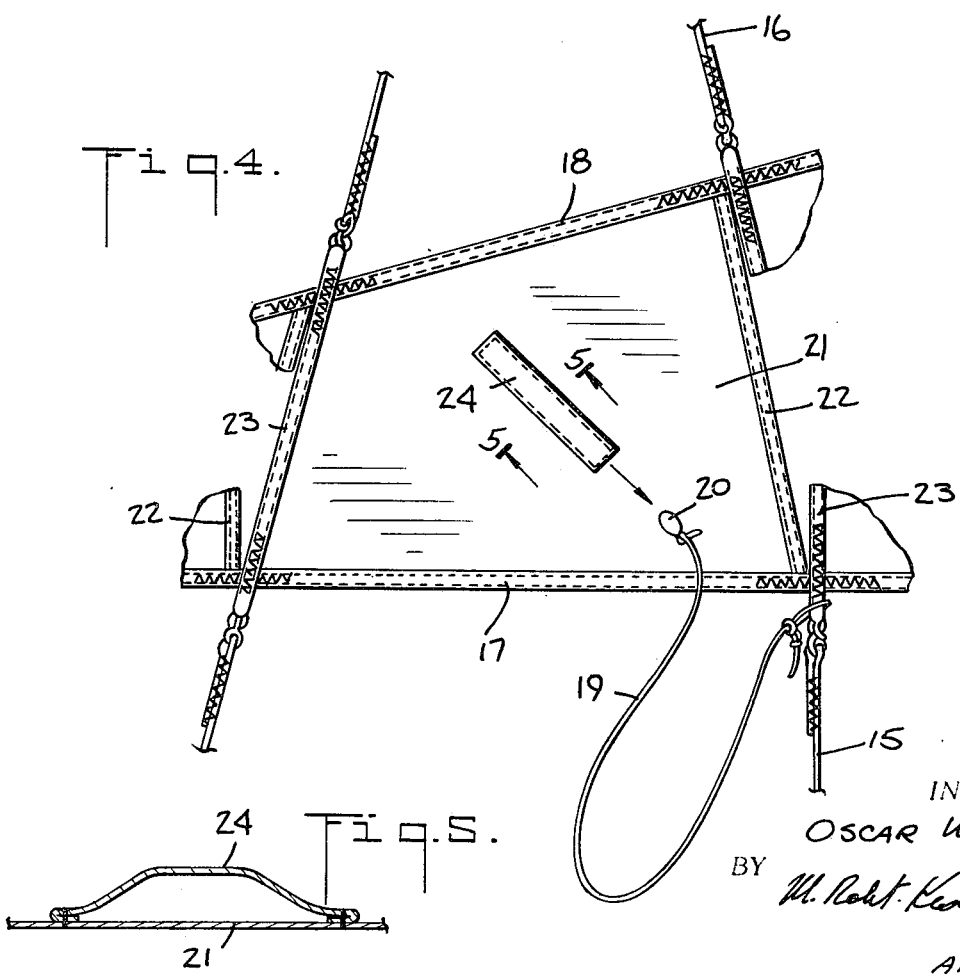

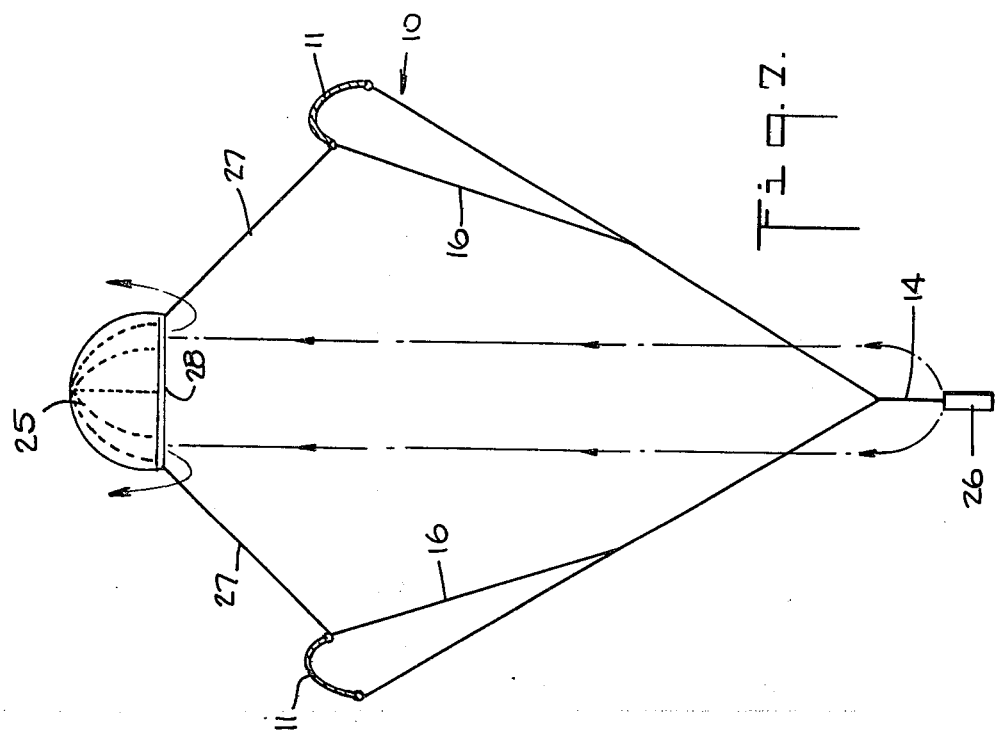
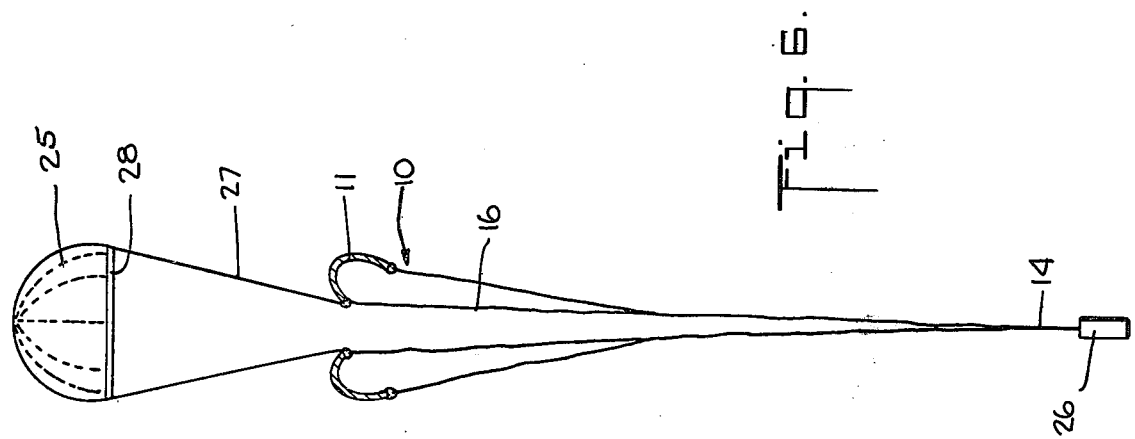

ROTATING PARACHUTE

This is a continuation of application Ser. No. 225,535, filed Feb. 11, 1972, now abandoned, which is a continuation in part of my co-pending application 20,331 filed Mar. 17, 1970 now abandoned.

This invention relates to parachutes and more particularly to parachutes of the rotating type.

High drag, high stability and fast deployment are all desirable parachute characteristics. And, to the extent that they can be combined in the same structure, that much more desirable is the particular parachute configuration.

The present invention combines each of these characteristics in a parachute of the rotating type. A series of vanes, similar to the blades of a turbine, are arranged in a ring and provide surfaces like air foils which rotate as the parachute descends. The rotation of the parachute is caused by air passing from the underside of the vanes upwardly and outwardly through the spaces between them. It is the rotation of these vanes which provides the greater lift and together with the low silhouette of the ring enhances the stability of the parachute. The shape and configuration of the ring of vanes is conducive to very fast deployment as the vanes catch the air, inflate into their air foil configuration and thrust themselves outwardly, forming the rotating ring. This form of parachute is called the Turbo-Drag or Turbine parachute.

Accordingly, it is an object of this invention to provide a rotating parachute having high drag, high stability and fast deployment characteristics.

It is another object of this invention to provide a ring parachute of low silhouette which offers a small effective area to sideways air forces.

It is a further object of this invention to provide a parachute comprised of air foils arranged in ring configuration which provides a very drag coefficient.

These objects are achieved in a turbine parachute comprising a canopy of an essentially circular band construction. The canopy is made up of a series of vanes in the form of elongated fabric quadrilateral panels secured end to end at their corners. Each panel is wider at its trailing edge than at its leading edge, so that when inflated each panel takes on an air foil configuration, and the opening between the adjacent edges of adjacent panels permits the passage of air from the interior of the canopy. Two suspension lines, one inner and one outer, are provided at the inner and outer corners of adjacent panels. The outer suspension lines extend to a common loop construction, concentric with the canopy where a swivel is carried for securing the canopy to the payload. Each inner suspension line extends downwardly to join its radially adjacent outer suspension line in the vicinity of its midpoint to form a stable air foil vane upon inflation.

These and other objects and advantages will be clear from the following descriptions in which:

FIG. 1 is a side view of the turbine parachute in the inflated condition,

FIG. 2 is a plan view of the turbine canopy in the inflated condition,

FIG. 3 is an enlarged sectional view taken along the lines 3—3 in FIG. 2,

FIG. 4 is a plan view of a canopy panel shown uninflated,

FIG. 5 is an enlarged sectional view taken along the lines 5—5 in FIG. 4,

FIG. 6 is a side view of the turbine parachute arranged and adapted for slow delivering with a heat source. The parachute is shown in the extended position prior to full inflation, FIG. 7 is a side view of the turbine parachute of FIG. 6 in the inflated condition.

Referring now to FIGS. 1 through 3, a circular band canopy, shown generally at 10, is formed by a series of vanes or buckets 11, secured together end to end at their corners. In the inflated condition as shown, each vane 11 is shaped to form a series of peripheral openings 12 which deflect the internal air tangentially over the air foil outer surface of the vane, resulting in rotation of the canopy. The effect of this rotation is an extremely stable canopy with a high drag characteristic.

To isolate the effect of this rotation, a swivel is secured at the loop 14 formed at the convergence of the suspension lines 15. Each vane 11 retains its stability as an air foil and avoids diversion during deployment and inflation by virtue of the inner suspension lines 16 which are connected at one end at the inner corners of the vanes at the other end to about the midpoint of the radially adjacent outer suspension line 15. The inner suspension lines 16 and outer suspension lines 15 are thus positioned on each vane radially inward and radially outward relative to each other. By virtue of this geometry, each individual vane or bucket 11 acts as an independent inflatable decelerator on its own. All decelerators are driving in the same direction and are physically connected by outer skirt band 17 stitched along their outer edges and inner skirt band 18 stitched along their inner edges to form the circular canopy. It has been observed that the effectiveness of the canopy does not depend upon the functioning of all of the vanes 11 in unison, so that if a vane blows the parachute continues to operate. In this embodiment, weights 19 are attached by lines 20 at equal spaces around the canopy 10. The purpose of these weights 19 is to increase, without additional volume, the likelihood that the canopy will catch and hang up in trees and the like. For certain end uses, such a characteristic is highly desirable.

Referring now to FIGS. 4 and 5, each panel 21 has an inner skirt band 18 stitched along its inner edge and an outer skirt band 17 stitched along its outer edge. Reinforcing tapes 22 and 23 are stitched along the trailing and leading edges respectively. the leading edge tapes 23 extend beyond the panel 21 in both the inner and outer directions and are doubled over and stitched to themselves to form a loop. To these loops, the inner and outer suspension lines 15 and 16 are tied by two half hitches and then stitched to themselves.

The panel has the trapezium shape as shown, when in the flat condition. This is a quadrilateral having no two sides parallel. When inflated, the panel takes on the bucket shape in which the inner and outer edges are substantially parallel.

The inner and outer skirt bands 18 and 17 physically connect the leading edge at tape 23 and the trailing edge at tape 22 of adjacent panels to form the unitary circular canopy construction. In stitching the trailing edges must be bunched up somewhat to facilitate stitching the skirt bands from one panel to the next.

When the weights 19 are to be used, a pocket 24 is sewn diagonally across the face of the panel 21 and the weight simply put into the pocket 24 during packing. The weight line 20 is attached around the outer extension of the leading edge tape 23 by a slip knot. Upon deployment of the canopy the weight are thrust radially outward by the rotation of the canopy.

In operation, the parachute, 10 including its canopy, suspension lines, riser, swivel, and bridle are packed in a deployment bag. The parachute may be ejected with its payload from a vehicle and deployed into the airstream from its deployment bag by any of several known methods. Once in the free air, as the parachute deploys, it commences rotation and turns the payload over into a stable vertical descent.

Nylon is employed in the panel fabric, tapes and suspension lines. Turbine parachutes according to the invention have been deployed successfully in size ranges from 16 inch diameter to 20 feet diameter and at deployment speeds of 625 knots per second. Larger and smaller parachutes are clearly possible. Turbine parachutes have displayed drag coefficients of 0.9 to 2.1 depending on canopy loading with stability within ± ½°, compared to ± 5° for non-rotating canopies.

Referring now to FIGS. 6 and 7 another embodiment of the turbine parachute is shown in which the canopy 10 has a cap 25 the purpose of which is to catch or entrap the light density air and gases which rise from a heat source, such as the burning flare 26, which is suspended from the parachute at the swivel at its loop end 14. Thus, in this embodiment the parachute achieves a "lighter than air" balloon effect for slow descent at little expense to total system weight. As the flare descends the hot air and gases rise and is trapped in the extended cap 25. The canopy 10 follows the construction details of FIGS. 1 through 4, with the omission of the weights 19 and the pockets 24.

Four suspension lines 27, 90 degs. apart, secure the cap 25 at its skirt 28 to the inner skirt band 18 at the attachment loops which secure the inner suspension lines 16 of the canopy. The opening shock force of the inflated cap is transferred through its suspension lines 27 to the inner suspension lines 16. The inflation of the canopy 10 is relatively unhindered by the cap 25. The cap 25 is further aft of the vanes 11, lest it encounter entanglement problems during deployment. The scale relation shown in FIG. 7 is about correct for a 16-foot configuration; modification of this scale relation may be appropriate for configurations of other sizes.

What is claimed is:

1. A rotating parachute comprising a plurality of fabric panels arranged in a ring and providing spaces between adjacent panels substantially over the ends thereof to allow air to pass from the interior of the parachute, and means for forming a plurality of independently inflatable decelerators of said panels, said means comprising outer suspension lines secured at radially outward corners of the panels, and inner suspension lines secured at radially inward corners of the panels, each of said inner suspension lines connecting with a radially adjacent outer suspension line below the parachute.

2. A rotating parachute according to claim 1 wherein said outer suspension lines converge towards a means for carrying a load and said inner suspension lines are joined to the mid portions of said outer suspension lines.

3. A rotating parachute according to claim 1 wherein the trailing edge of said panel is longer than its leading edge so as to form an air foil contour when inflated, said air flowing over said contour upon passing from the interior of said parachute.

4. A rotating parachute according to claim 1 wherein an outer skirt band is secured at the outer edge of said panels and an inner skirt band is secured at the inner edge of said panels, said skirt bands serving to retain said panels in said ring arrangement.

5. A rotating parachute according to claim 4 wherein tape means are secured at least at one of the leading and trailing edges and said inner and outer suspension lines are attached to said tape means.

6. A rotating parachute according to claim 1 wherein a plurality of weights are attached by lines at outer panel corners equally spaced about the parachute.

7. A rotating parachute according to claim 6 wherein weight pockets are secured to said panels from which said weights can be projected outwardly upon inflation of the parachute.

8. A rotating parachute according to claim 1 wherein said suspension lines are joined to a load through swivel means to substantially isolate the load from the parachute rotation.

9. A rotating parachute according to claim 1 wherein said panels are arranged end to end with adjacent corners of adjacent panels fixed close together and said space between them having a substantially radial orientation in one direction.

10. A rotating parachute comprising a plurality of air foil-like fabric panels arranged leading edge towards trailing edge in a ring with an opening between the leading and trailing edges of adjacent panels, and means for forming each of said panels into a vane which acts as an independently inflatable rotating decelerator on its own, said means comprising suspension means secured along the radially inward and radially outward edges of said panels and coming together below said panels to form an individually inflatable rotating decelerator of each panel.

11. A rotating parachute according to claim 10 wherein said suspension means secured at said radial inward edges and said radial outward edges of each panel are radially adjacent and come together in radially adjacent pairs.

12. A rotating parachute according to claim 11 wherein said inner and outer suspension means are secured to said parachute near adjacent edges of adjacent panels.

13. A rotating parachute according to claim 10 wherein inner and outer skirt bands reinforce the inner and outer edges of said panels respectively and secure adjacent panels close to each other at their leading and trailing corners.

14. A rotating parachute according to claim 10 wherein each of said panels is in trapezium form when uninflated and forms substantially parallel inner and outer edges when inflated.

15. A rotating parachute according to Claim 10 wherein the suspension means secured at said radially inward edges are joined to the suspension means secured at said radially outward edges at its mid-portion.

16. A rotating parachute according to claim 15 wherein said outer suspension means converge to a concentric position for attachment to means for securing to a load.

* * * * *